(12) United States Patent
Chauvin et al.

(10) Patent No.: US 6,823,104 B2
(45) Date of Patent: Nov. 23, 2004

(54) CONTROLLING MESSAGING IN AN OPTICAL NETWORK

(75) Inventors: Jean Guy Chauvin, Navan (CA); Jian J. Song, Kanata (CA); Rudy Vianna, Hull (CA)

(73) Assignee: Nortel Networks Limited, St. Laurent (CA)

( * ) Notice: Subject to any disclaimer, the term of this patent is extended or adjusted under 35 U.S.C. 154(b) by 264 days.

(21) Appl. No.: 10/014,805

(22) Filed: Dec. 14, 2001

(65) Prior Publication Data

US 2002/0102050 A1 Aug. 1, 2002

(30) Foreign Application Priority Data

Dec. 20, 2000 (CA) .............................................. 2329098

(51) Int. Cl.[7] .............................. G02B 6/28; H04L 12/28
(52) U.S. Cl. ............................ 385/24; 385/16; 370/254; 370/351
(58) Field of Search ........................... 385/16, 24; 398/9, 398/12, 13, 19, 20, 151; 370/251, 254, 351, 360

(56) References Cited

U.S. PATENT DOCUMENTS 4,695,127 A * 9/1987 Ohlhaber et al. ........... 385/101
2002/0041413 A1 * 4/2002 Wang et al. ................. 359/128

OTHER PUBLICATIONS

Shiragaki et al. Optical Cross–Connect System Incorporated with Newly Developed Operation and Management System, IEEE Journal on Selected AReas in Communications, vol. 16, No. 7, Sep. 1998, pp 1179–1189.*

* cited by examiner

Primary Examiner—John D. Lee
Assistant Examiner—Sarah N Song

(57) ABSTRACT

A system and method for control messaging in an optical network is provided. A provisioning data path for the transmission of provisioning data to an Operations, Administration, Maintenance, and Provisioning (OAM&P) subsystem is provided within a prefabricated cable When the prefabricated cable is placed in the system during the provisioning process, provisioning information is transmitted to the OAM&P subsystem over the provisioning data path and a cross-connector. Later the same path may be used to transmit data regarding the logical provisioning of the connection.

13 Claims, 3 Drawing Sheets

CONTROLLING MESSAGING IN AN OPTICAL NETWORK

FIELD OF THE INVENTION

The invention lies in the field of Optical switching—Dense Wave Division Multiplexing (DWDM), specifically in the area of operation and provisioning of networks.

BACKGROUND OF THE INVENTION

One of the major issues in the telecommunications industry today is the ongoing demand for more and more bandwidth. Today, so-called third generation networks employ Wavelength Division Multiplexing technology where both the transmission and the switching of data are in the optical domain. Dense Wavelength Division Multiplexing (DWDM) involves the process of multiplexing many different wavelength signals onto a single fibre. Use of DWDM allows providers to offer services such as e-mail, video, and multimedia carried as Internet Protocol (IP) data over asynchronous transfer mode (ATM) and voice carried over Synchronous Optical NETwork (SONET) (or Synchronous Digital Hierarchy (SDH)). SONET/SDH are defined by a set of related standards for synchronous data transmission over fibre optic networks. The standard for SONET is the United States version and is published by the American National Standards Institute (ANSI). The international version of SDH is the standard published by the International Telecommunications Union (ITU). The differences between SONET and SDH are slight and restricted to the basic frame format.

Despite the fact that these formats—IP, ATM, and SONET/SDH—provide unique bandwidth management capabilities, all three can be transported over the optical layer using DWDM. This unifying capability allows the service provider the flexibility to respond to differing customer demands over one network.

One property of a DWDM all-optical network is the ability to do wavelength routing. Here, the path of the signal through the network is determined by the wavelength and origin of the signal, as well as the states of the network cross-connects and wavelength changers. Wavelength routing provides a transparent light path between network terminals. A light path is the path that an optical signal traverses in the network from a source to a single destination and may include all-optical wavelength changers.

A property of optical cross-connects is that the optical channels, (also referred to as wavelengths or colours) which are typically fully utilised in carrying data and the related protocols, can be transmitted and inter-connected without knowledge of the data protocol, or even the bit-rate of the data.

There exist cross-connects (including switches, multiplexors, concentrators and interconnects) which need have no knowledge of the data or protocol. These cross-connects act purely at the 'physical layer', the Layer 1 of the International Standards Organisation (ISO) protocol stack. A number of such cross-connects may be co-located to permit higher concentration of traffic thereby taking advantage of the inherent high bandwidth of DWDM transmission systems.

In these existing systems, a separate connection, typically in the form of an Ethernet, is used to carry information between the various system modules and the Operations, Administration, Maintenance, and Provisioning (OAM&P) subsystem. Among other functions, the OAM&P subsystem is responsible for managing the configuring and provisioning of the network and confirming both their correct configuration and ongoing correct operation. In order to carry out part of this function, information regarding configuration is passed to the OAM&P subsystem from the cross-connect (switches, routers and interconnects) controllers and compared with that expected, any differences being indicated to the personnel responsible.

The configuration and provisioning information available from the network is of two types: physical and logical. Typical pieces of information relating to the physical provisioning are the Source and Destination identities of the optical channels. During logical provisioning, the data rate (bit-rate) and protocol are typical of the information made available by the source. This information may be provided to the source directly by some form of call controller associated with the multi-service platform and the other network cross-connects, or from the OAM&P subsystem over the normal OAM&P link.

Currently a significant proportion of optical connections are misconfigured. This leads to extra expense in tracking down and correcting problems as well as potential loss of income. The difficulty in determining that a connection is misrouted has resulted in network providers (or carriers) ordering and installing new equipment rather than risk disrupting live traffic in their attempts to track down misrouted connections. Further, the lack of knowledge of the nature of data being carried has made it difficult and expensive to verify that a connection has been correctly configured.

What is needed is a mechanism to ensure that connections are correctly made during configuration. The need to make these connections less prone to configuring errors becomes especially important where dynamic routing or reconfiguration is being used.

SUMMARY OF INVENTION

This invention seeks to overcome the problems described above. It achieves this by providing a mechanism to pass connection information regarding a particular path or fibre to the OAM&P subsystem in a manner which eliminates, or at least minimises, the potential for introducing inaccurate information regarding the provisioning of the particular path or fibre. Hitherto, there existed opportunities for error during both physical provisioning (when the various physical units are interconnected with fibre cables) and logical provisioning (when the channels within the various fibres are assigned to carry traffic between customers and the network)

In accordance with an aspect of the present invention, there is provided a control messaging system, which includes; an optical cable which is connected to a multi-service platform (MSP) at one end and is connected to a connecter at the other end; the MSP has a first controller; the connector having a cross-connect and a second controller; within the optical cable, a number of optical fibres being assigned for the transmission of data; at least one of the optical fibres being assigned for use as a provisioning data path; an Operations, Administration. Maintenance and Provisioning (OAM&P) subsystem connected to the provisioning data path through the connector; the first controller signaling a source identity to the OAM&P subsystem over the provisioning data path; and the second controller signaling a destination identity to the OAM&P subsystem from the cross-connect.

In accordance with an aspect of the present invention, there is provided a method of provisioning a system, which includes the steps of; starting a process at a first entry; plugging in an optical cable to a connecter having a cross-connect, viz, the destination. and a multi-service platform, viz, the source; the optical cable having a number of optical fibres assigned for the transmission of data; at least one of said optical fibres being uniquely assigned for use as a provisioning data path; forwarding the destination identity from the cross-connect to an OAM&P subsystem; forwarding the source identity from the multi-service platform to the OAM&P subsystem over the uniquely assigned provisioning data path within the optical cable.

The invention is found in a system comprising switches and cross-connects for optical networks, examples of which are the "OPTera Connect LX Core" and the "OPTera Metro 5200 Multi-service platform", both supplied by Nortel Networks.

In the system in which the invention is practised, the shelves and ports of the various units are connected to a central cross-connect system. These connections are assigned unique fibres on the basis of a single colour per fibre, which is directly connected to a particular incoming or outgoing colour on a customer or network fibre. The connections are usually provided as a 'transparent' facility, and the optical bandwidth is in some cases fully used by the data and protocols being carried on a fibre. These facts mean that it is impractical to add any further data to that channel for use in verification of a connection.

The OPTera Metro 5200 supports protocols in native format through a single interface. Once deployed, this interface delivers a particular service and can be altered remotely without hardware changes should an upgrade or other change be required after deployment. Bit-rate independence and protocol independence eliminate the uncertainty associated with forecasting service needs and enables rapid service activation regardless of connection type.

The invention is implemented by including within the prefabricated cables used to interconnect the various system modules, a separate path for the transmission of provisioning data to an Operation, Administration, Maintenance, and Provisioning subsystem (OAM&P). This is referred to as the provisioning data path. When a prefabricated cable is placed in the system during the physical provisioning process, the physical location of both ends of the cable is detected automatically and the information transmitted to the OAM&P subsystem over the provisioning data path to be validated and recorded as necessary. Thus, errors can quickly be identified, and corrections made. Later the same path may be used to transmit data regarding the logical provisioning of the connection, further ensuring the correctness of both the physical and logical connections.

It will be understood by persons skilled in the art that this applies also to duplex operation.

Although this description relates to a system which uses static configuration, the ideas and concepts are equally applicable to a system which uses dynamic, or on-demand, configuration and assignment of fibres and channels.

Other aspects of the invention will be clear on examination of the figures and detailed description following.

DETAILED DESCRIPTION

Figure 1:
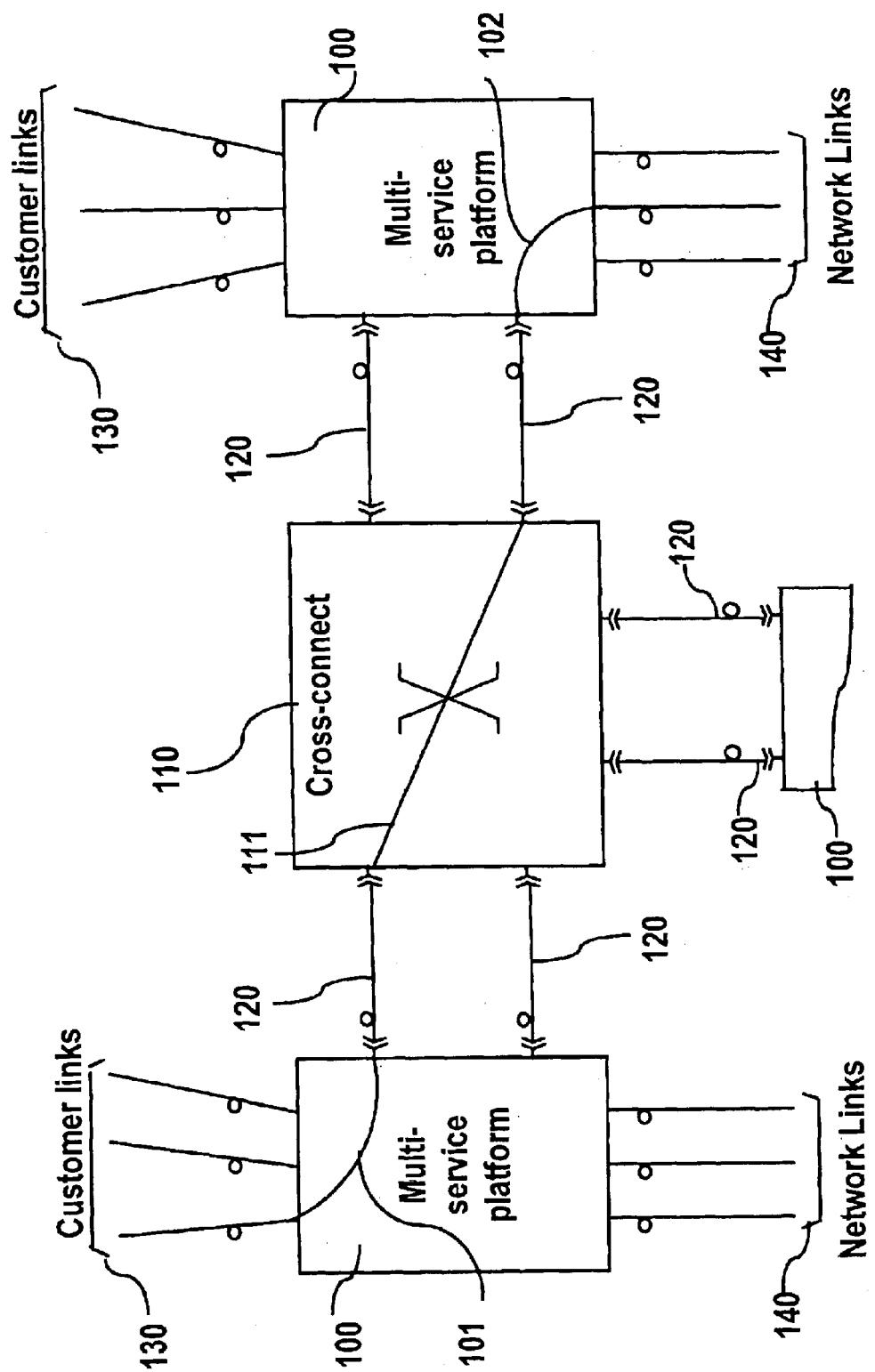
FIG. 1 shows a typical configuration of multiplexing and interconnection elements in which the invention is practised.

Referring to FIG. 1, a typical configuration or environment in which the present invention is practised comprises two or more (optical) multi-service platforms (MSP) 100 of which two are shown, with part of a third, the "Optera 5200 multi-service platform" being typical, interconnected over a cross-connect 110, the "Optera Connect LX Core" being typical. The interconnecting paths consist of prefabricated individual cables 120 containing a number of optical fibres of which one or more are assigned for carrying data. Each multi-service platform 100 has customer links 130 and network links 140, which may be interconnected via the cross-connect 110. Specific customer links 130 and network links 140 comprise one or more colours or wavelengths within customer and network fibres. During physical provisioning, each interconnecting cable 120 provides a potential connection between a given customer link 130 and a network link 140, but no data connection is made across either the MSP 100 or the cross-connect 110.

During logical provisioning, an individual colour or wavelength on an incoming customer link 130 is connected using a path 101 within an MSP 100 to a single fibre in an interconnecting cable 120. Similarly an individual colour or wavelength on an outgoing network fibre 140 is connected using a path 102 within an MSP 100. A further path 111 is established within the cross-connect 110. thereby allowing data to be transferred from the customer link 130 to the network link 140.

Figure 2:
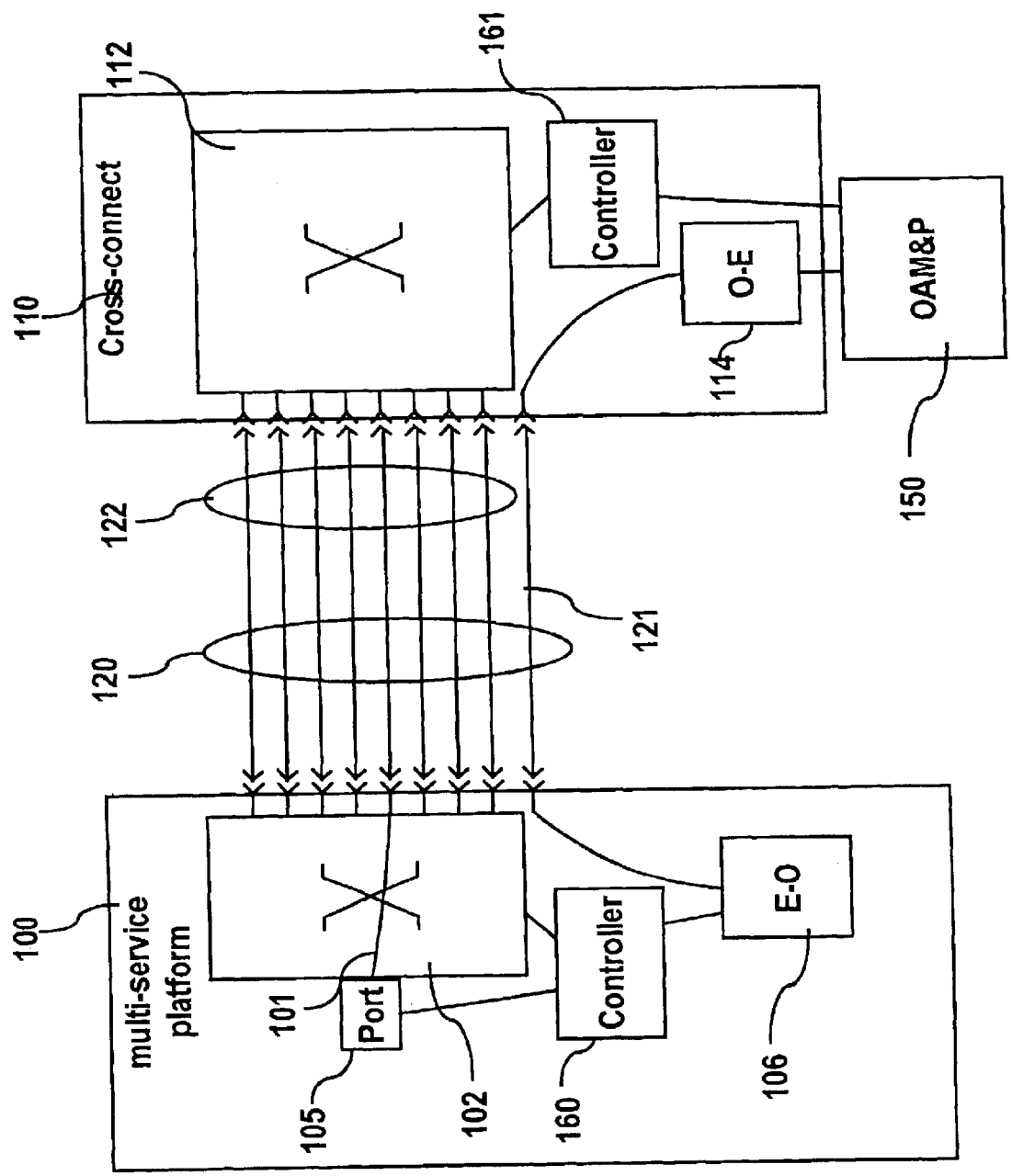
FIG. 2 shows more detail of the interconnecting links and their relationship to the other elements.

Referring now to FIG. 2, in which a single prefabricated cable 120 connecting a multi-service platform 100 to a cross-connect 110 is illustrated in more detail. In a first preferred embodiment of the present invention, during physical provisioning, information relating to the source identity of the cable 120 is derived by a controller 160 from the interconnect 102 of the multi-service platform 100 and inserted onto an otherwise unused fibre assigned as a provisioning data path 121 at the multi-service platform 100, with Electrical to Optical (E-O) conversion 106 as required. Information relating to the destination identity is derived by another controller 161 from the cross-connect 110 for onward transmission to the OAM&P subsystem. Any of the individual data fibres 122 may be connected within the multi-service platform 100 to a specific port 105 over an internal link 101.

Since the extra fibre 121 is an integral part of the physical cable 120 used to interconnect the modules, the correctness of the connection (or rather the reported connection) can be expected to be higher than with existing methods. The location of the physical terminations of the physical cable or bundle provides automatic confirmation of its physical attributes—namely the physical source and physical destination identities.

Later, once the physically provisioned link is assigned to a customer and placed in service through the logical provisioning process, the bit-rate and protocol type are transmitted from the source port 105 using the controller 160 and passed to the OAM&P subsystem 150, again over the provisioning data path 121. Electrical to Optical (E-O) conversion 106 and Optical to Electrical (O-E) conversion 114 of signalling are provided at the multi-service platform 100 and the cross-connect 110 respectively, if required. In some implementations, this transmission may take place even in cases where the source port has been informed of the information by the OAM&P subsystem in the first place, since it serves to further confirm the correctness of the connection.

In a further embodiment of the present invention, the provisioning data path is implemented as a second colour on one or more of the data fibres 122 within the prefabricated cable 120.

In yet another embodiment of the present invention, the provisioning data path is implemented as an electrical circuit within the prefabricated cable 120.

In a yet further embodiment of the present invention, the provisioning data path is implemented using two or more unused fibres within the prefabricated cable 120 which are together assigned as a provisioning data path 121.

Figure 3:
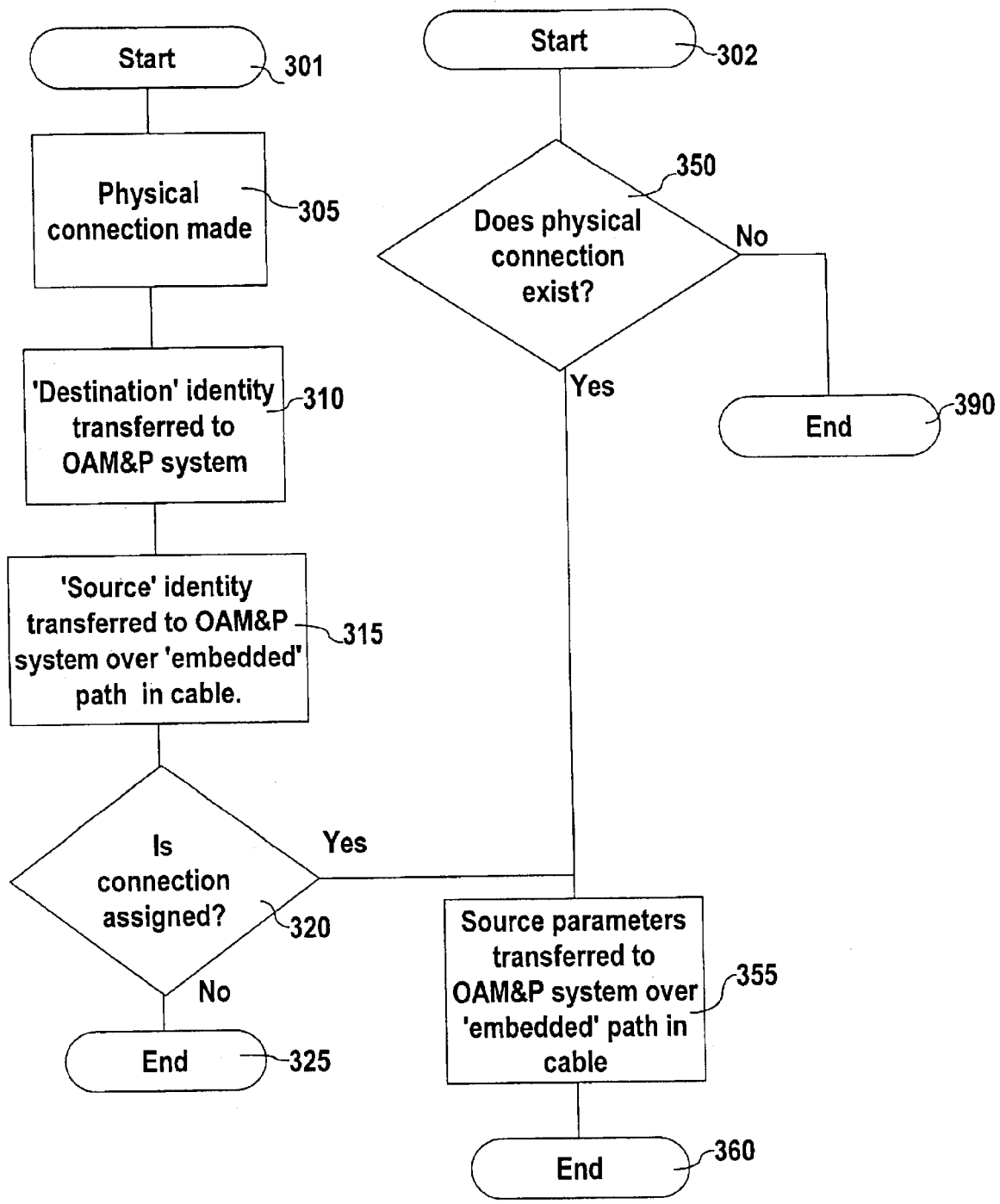
FIG. 3 gives, in the form of a flowchart, a typical sequence of events and actions required during physical and logical provisioning and operation.

The flowchart in FIG. 3 shows some typical sequences of events during the provisioning processes and is next described with reference also to FIG. 2. The process usually starts at step 301 When a prefabricated cable 120 is physically plugged in to the system. in the case described here making this physical connection at step 305 results in the destination identity, that is the identity of the connection at the cross-connect, to be transmitted to an OAM&P subsystem at step 310. Next the identity of the source, that is the identity of the connection at the MSP, is transmitted to the OAMP&P subsystem 160 over the embedded provisioning data path 121 at step 315. If the connection has not yet been assigned at step 320, The process terminates at step 325. Otherwise the relevant source parameters, for example the bit-rate and protocol, are also transmitted to the OAM&P subsystem 150 over the embedded provisioning data path 121 at step 355.

In cases where the logical provisioning process is carried out separately, the process stasis at step 302 and a check is carried out to ensure a physical connection already exists at step 350. If it does not exist, the process terminates at step 390. Otherwise the source parameters are transferred to the OAM&P subsystem at step 355 as described previously.

One further aspect of the present invention is the ability to automate some part of reporting to the OAM&P subsystem during provisioning. In this aspect, the act of putting a new interconnection in place using a prefabricated cable triggers a series of events leading to a number of messages being sent to the OAM&P subsystem. These messages accurately report the source and destination identities during physical provisioning, and can include bit-rate and protocol information once the channel has been assigned by logical provisioning.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A control messaging system comprising:
   an optical cable which is connected to a multi-service platform (MSP) at one end and is connected to a connecter at the other end, said multi-service platform having a first controller, said connector having a cross-connect and a second controller;
   within said optical cable, a number of optical fibres assigned for the transmission of data, at least one of said optical fibres being assigned for use as a provisioning data path;
   an Operations, Administration, Maintenance and Provisioning (OAM&P) subsystem connected to said provisioning data path through said connector;
   said first controller signaling a source identity to said OAM&P subsystem over said provisioning data path; and
   said second controller signaling a destination identity to said OAM&P subsystem from said cross-connect.

2. A system as in claim 1 wherein said provisioning data path is provided as an additional optical fibre within said optical cable.

3. A system as in claim 1 wherein said provisioning data path is provided as an additional 'colour' on a fibre used for the transmission of data.

4. A system as in claim 1 wherein said provisioning data path is provided as an electrical circuit within said optical cable.

5. A system as in claim 1 wherein said first controller signals, at the time of logical provisioning, from said multi-service platform, over said provisioning data path to said OAM&P subsystem, the bit-rate and protocol to be used.

6. A method of provisioning a system comprising the steps of;
   plugging in an optical cable to a connecter having a cross-connect, viz. the destination, and a multi-service platform, viz. the source, said optical cable having a number of optical fibres assigned for the transmission of data, at least one of said optical fibres being uniquely assigned for use as a provisioning data path;
   forwarding the destination identity from said cross-connected to an Operations, Administration, Maintenance and Provisioning (OAM&P) subsystem; and
   forwarding the source identity from said multi-service platform to said OAM&P subsystem over said uniquely assigned provisioning data path within said optical cable.

7. The method of claim 6 wherein said provisioning data path is provided as an additional optical fibre within said optical cable.

8. The method of claim 6 wherein said provisioning data path is provided as an additional 'colour' on a fibre used for the transmission of data.

9. The method of claim 6 wherein said provisioning data path is provided as an electrical circuit within said optical cable.

10. The method of claim 6 further comprising the step of transferring source parameters to said OAM&P subsystem over said uniquely assigned path within said optical cable after the forwarding steps.

11. The method of claim 10 wherein said source parameters are selected from a group consisting of bit-rate and protocol.

12. The method of claim 6 further comprising the steps of:
    checking whether a physical connection exists; and
    if said physical connection exists, transferring source parameters to said OAM&P subsystem over said uniquely assigned path within said optical cable without performing the forwarding steps.

13. The method of claim 12 wherein said source parameters are selected from a group consisting of bit-rate and protocol.

* * * * *